US009672597B2

(12) United States Patent
Amiot et al.

(10) Patent No.: US 9,672,597 B2
(45) Date of Patent: Jun. 6, 2017

(54) METHOD FOR REDUCING NOISE IN SEQUENCES OF FLUOROSCOPIC IMAGES

(71) Applicant: THALES, Courbevoie (FR)

(72) Inventors: Carole Amiot, Moirans (FR); Catherine Girard, Moirans (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/901,240

(22) PCT Filed: Jun. 25, 2014

(86) PCT No.: PCT/EP2014/063391
§ 371 (c)(1),
(2) Date: Dec. 28, 2015

(87) PCT Pub. No.: WO2014/207042
PCT Pub. Date: Dec. 31, 2014

(65) Prior Publication Data
US 2017/0004601 A1    Jan. 5, 2017

(30) Foreign Application Priority Data
Jun. 28, 2013 (FR) ...................... 13 01524

(51) Int. Cl.
*G06K 9/00* (2006.01)
*G06T 5/00* (2006.01)
(Continued)

(52) U.S. Cl.
CPC ................ *G06T 5/002* (2013.01); *G06T 5/20* (2013.01); *G06T 7/0016* (2013.01);
(Continued)

(58) Field of Classification Search
CPC ................ G06K 9/00; G06T 5/00; G06T 7/00
(Continued)

(56) References Cited

U.S. PATENT DOCUMENTS 8,509,028 B2 * 8/2013 Neelamani ............. G01V 1/005
367/31
2014/0153842 A1 * 6/2014 Pescatore ................ G06T 5/002
382/264

FOREIGN PATENT DOCUMENTS

EP    2 385 494 A1    11/2011
FR    2 978 273 A1    1/2013

OTHER PUBLICATIONS

Carole Amiot et al., "Contextual filtering in curvelet domain for fluoroscopic sequences," Proceedings of SPIE, vol. 3669, Mar. 13, 2013, pp. 86690N, XP055106483.
(Continued)

*Primary Examiner* — Abolfazl Tabatabai
(74) *Attorney, Agent, or Firm* — Baker & Hostetler LLP (57) ABSTRACT

A method for reducing noise in flouroscopic images by detection of the traits in the curvelet domain, matching of the detected traits and time-domain filtering adapted to the type of coefficients associated with a trait. The method uses the discrete curvelet transforms of the images from a sequence. The denoised coefficients are detected, then transmitted to a step for locally matching the traits, the matched data subsequently undergo a step for time-domain filtering allowing the movement of the objects to be preserved in the image and a step for a 2D IDCT (Inverse Discrete Curvelet Transform) in order to produce the final image.

13 Claims, 2 Drawing Sheets

(51) Int. Cl.
*G06T 5/20* (2006.01)
*H04L 27/00* (2006.01)
*G06T 7/00* (2017.01)

(52) U.S. Cl.
CPC ............... *G06T 2207/10016* (2013.01); *G06T 2207/10121* (2013.01); *G06T 2207/20048* (2013.01); *G06T 2207/20182* (2013.01); *G06T 2207/30004* (2013.01)

(58) Field of Classification Search
USPC ....... 382/128, 129, 130, 131, 132, 133, 134; 378/4, 8, 21–27, 901; 375/254, 346
See application file for complete search history.

(56) References Cited

OTHER PUBLICATIONS

Jean-Luc Starck et al., "The Curvelet Transform for Image Denoising," IEEE Transactions on Image Processing, vol. 11, No. 6, Jun. 2002, pp. 670-684, XP002485325.

M. Cesarelli et al., "X-ray fluoroscopy noise modeling for filter design," International Journal of Computer Assisted Radiology and Surgery, vol. 8, No. 2, Mar. 1, 2013, pp. 269-278, XP055106488.

A. Buades et al., "A review of image denoising algorithms, with a new one," Multiscale Modeling & Simulation, Society for Industrial and Applied Mathematics, vol. 4, No. 2, Jul. 18, 2005, pp. 490-530, XP002496485.

Vincent Bismuth et al., "A device enhancing and denoising algorithm for x-ray cardiac fluoroscopy," IEEE 19th International Conference on Pattern Recognition, 2008, pp. 1-4.

M. Tomic et al., "Adaptive spatio-temporal denoising of fluoroscopic x-ray sequences," Biomedical Signal Processing and Control, vol. 7, No. 2, pp. 173-179, 2012.

Vincent Auvray et al., "Joint motion estimation and layer segmentation in transparent image sequences—Application to noise reduction in x-ray image sequences," Journal on Advances in Signal Processing, vol. 2009, Article ID 647262, pp. 1-21.

S. Nigam et al., "Curvelet transform-based technique for tracking of moving objects," The Institute of Engineering and Technology, Computer Vision, vol. 6, Iss. 3, pp. 231-251, 2012.

* cited by examiner

METHOD FOR REDUCING NOISE IN SEQUENCES OF FLUOROSCOPIC IMAGES

CROSS-REFERENCE TO RELATED APPLICATIONS

This application is a National Stage of International patent application PCT/EP2014/063391, filed on Jun. 25, 2014, which claims priority to foreign French patent application No. FR 1301524, filed on Jun. 28, 2013, the disclosures of which are incorporated by reference in their entirety.

FIELD OF THE INVENTION

The subject of the invention relates to a method for reducing noise in sequences of fluoroscopic images by detection of the traits in the curvelet domain, matching of the detected traits and time-domain filtering adapted to the type of coefficients associated with a trait.

The invention is notably used in the field of X-ray imaging and, more particularly, that of medical imaging.

BACKGROUND

In the field of medical imaging, imaging by X-ray fluoroscopy allows a stream of images of a patient to be supplied to a doctor during surgical interventions referred to as 'minimally invasive'. The use of these 'minimally invasive' operations is becoming more widespread since they cause a lower level of post-operative pain for the patients and because they reduce the risks of infection. These operations require the ability to track medical objects within the arterial system of the patient, for example with the aid of sequences of images acquired by X-rays. Such an intervention can be long and the dose of radiation to which the patient is subjected can have detrimental effects on the health of the patients being exposed. For the health of the medical personnel as well as that of the patient, it is therefore necessary to reduce as much as possible the dose of X-rays received. However, a decrease in the dose of X-rays leads to an increase in the noise and a reduction in the contrast on the images. It is therefore important, if it is desired to be able to reduce the X-ray dosage per image, to have denoising or noise-reduction algorithms available in order to display images of good quality.

Various methods have been developed in the prior art for reducing the noise in images. These methods make use, for example, of wavelet transforms. The major drawback of wavelet transforms is their difficulty in correctly taking the contours of the images into account. The number of orientations that a wavelet can take depends on the type used. In any case, the basic functions do not exhibit anisotropy, which does not endow them with optimal properties for the representation of the curves and, at the most, a real wavelet can take 6 different orientations. This number is insufficient for representing in an optimal manner the diversity of the orientations contained in a natural image.

In the document entitled: "A device enhancing and denoising algorithm for x-ray cardiac fluoroscopy", published in Pattern Recognition, 2008, ICPR, 2008, 19th International Conference on, pp. 1-4, IEEE, 2008, Bismuth et al. use the wavelet transform in order to obtain a denoised background, but this has a tendency to interfere with the contours.

In the document entitled "Adaptive spatio-temporal denoising of fluoroscopic x-ray sequences" published in Biomedical Signal Processing and control, vol. 7, n°2, pp 173-179, 2012, Tomic et al. promote a spatio-temporal approach, since they re-index their 2D+time signal into a 1D signal. Thus, after the application of a wavelet transform preserving the contours, they obtain a signal denoised in both the space and time domains. However, because of the re-indexation, the method does not allow significant movements, such as heart movements, to be taken into account which then require a spatial repositioning.

Other methods have concentrated only on the time-behavior aspect, in order to take advantage of the redundancy of the images from the sequence and to avoid a spatial coloring of the noise. One method described in the document by Auvray et al., "Joint motion estimation and layer segmentation in transparent image sequences-Application to transparent-motion-compensated noise reduction in x-ray image sequences", 2008, provides a time-domain filtering while compensating for the movements. It is possible to make the approximation that one pixel is associated with a single movement vector. This simplifies the method but introduces errors. Since the flouroscopic images are multiplicative, the anatomical layers are superposed. However, they are subject to different movements and it is probable that several objects following different paths appear on the same pixel. The idea of Auvray et al. is thus to separate the transparent layers and to evaluate the movement vectors on each of these layers. This method has the drawback of having to evaluate the number of transparent layers in each part of the image, which is extremely difficult to obtain.

Figure 1:
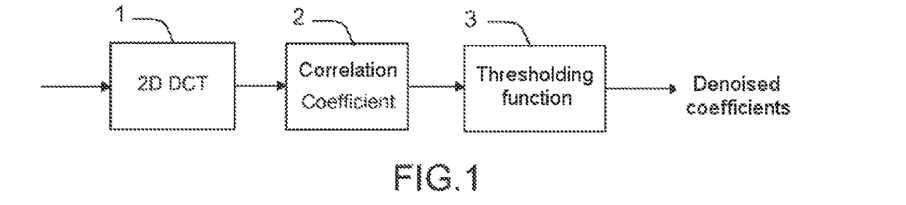
FIG. 1, a schematic layout of a method according to the prior art.

FIG. 1 shows schematically a method known from the prior art which implements the spatial aspect of the denoising by the curvelets method. The image undergoes a step for 2D spatial transform, then the correlation properties of the coefficients are verified. If these properties are not complied with, the amplitude of the coefficients in question is modified prior to applying the thresholding function. The method uses, for example, three thresholds bounding four regions in the thresholding function. These regions are used for verifying the coherence between the coefficients and to thus detect significant changes which might be due to noise. The algorithm having been currently developed allows the contours to be preserved during the denoising.

The spatial processing described allows the number of artifacts present in the denoised image to be reduced, but it does not allow it to be totally eliminated. In particular, the lower the dose, the more the number of artifacts increases. The low spatial redundancy and the time constraints do not allow the performance characteristics of this processing to be improved. It is nevertheless possible to use it with a time-domain filtering which averages the values of a pixel of the image over time. This filter is applied prior to the spatial filtering, and the combined use of the two allows denoised images to be obtained without artifacts. However, in order to preserve the objects in motion, the denoising capacities of the time-domain filter are reduced. Its use therefore limits the possibilities with regard to the reduction in X-ray dose.

The publication entitled "Curvelet transform-based technique for tracking of moving objects" by S. Nigam and A. Khare, Computer Vision, IET, vol. 6, no. 3, pp 231-251, 2012 describes a method for tracking objects in curvelets. It uses the conservation of the total energy (inter- and intra-scale) in order to update the position of the object being tracked. The results have been published for non-noisy videos and show better tracking results than the spatial methods or those for tracking in wavelets.

SUMMARY OF THE INVENTION

The subject of the invention is based on a novel approach which allows the performances of the time-domain filtering to be improved in terms of noise reduction, while at the same time conserving the objects in motion. The method according to the invention will use discrete curvelet transforms of the images from the sequence.

The invention relates to a method for reducing noise in a sequence of fluoroscopic images acquired by an X-ray detector, an image comprising one or more traits, an image being represented by curvelet coefficients $c_{t,s,\theta sb,i,j}$ where s is the scale of the image, $\theta_{sb}$ its sub-band linked to the angle of a trait in the image and (i,j) its relative position, the method being characterized in that it comprises in combination at least the following steps:

detection of the traits in an image in the curvelet domain, using the curvelet coefficients sub-band by sub-band and by determining the maximum response of a filter associated with a sub-band $\theta_{sb}$, and the detected traits are stored in memory,
   the detected traits are locally matched,
      considering a set of curvelet coefficients, it is tested whether a curvelet coefficient being considered belongs to a trait detected at the time t or at an earlier time,
      if the curvelet coefficient belongs to a detected trait, it is tested whether the trait, to which the coefficient belongs, is matched to a trait detected at an earlier time, and if this is the case, then the curvelet coefficient is categorized in a first set,
      if the coefficient is not detected, or if the curvelet coefficient belongs to a detected trait but not matched to a trait detected at an earlier time, then at least a second set is formed,
   a first coefficient is applied for time-domain filtering the curvelet coefficients belonging to the first set and at least a second coefficient for time-domain filtering the curvelet coefficients belonging to the second set,
   the denoised image is determined using the time-domain filtered curvelet coefficients.

According to another variant embodiment, the method comprises at least one step for detection of the traits comprising for example the following steps:

detection of the trait or traits in the image by processing in the curvelet domain by concatenating the curvelet coefficients sub-bands by sub-bands,
      the scale at the highest frequency curvelet $s_{max}$ is adopted in the decomposition,
      for each curvelet coefficient $c_{t,s,\theta sb,i,j}$, its parent coefficients at the lower scales containing high-frequency information are calculated,
      these curvelet coefficients are subsequently summed so as to obtain a matrix of concatenated coefficients $c_{concatenated}$,
   the detection of the traits is applied to the matrices of concatenated coefficients,
      for each concatenated coefficient, the maximum response of the oriented filters associated with this sub-band is calculated:

$$F(c_{concatenated}) = \max_{filters} \sum_{p,q \in filter} |c_{concatenated}(\theta_{sb}, i+p, j+q)|$$

with p, q positions that yield an orientation,
      the result of the maximum response is thresholded by hysteresis which yields the traits retained and recorded for the given image; when a coefficient is greater than the high threshold, all of its extended neighborhood higher than the low threshold is conserved,
      a reference trait is defined by selecting the position of the trait at the scale of highest frequency, According to one variant embodiment, the method comprises a step for locally matching the traits comprising, for example, the following steps:

a set of curvelet coefficients defined at a time t−1 earlier than the time t is considered,
      it is tested whether a curvelet coefficient belongs to a trait detected at the time t or at the time t−1,
         if the result of the test is negative, then the curvelet coefficient is categorized as not belonging to an object,
         if the result of the test is positive, then,
            it is tested whether the trait to which the coefficient belongs is matched to a trait detected at the time t−1 or at the time t−2,
            if the result of the test is negative, then the curvelet coefficient is categorized as not belonging to an object,
            if the result of the test is positive, then the curvelet coefficient is categorized as belonging to an object,
   at least two sets of coefficients are obtained corresponding to at least two types of curvelet coefficients.

The method may also comprise a step for time-domain filtering comprising, for example, the following steps:

for the curvelet coefficients not belonging to an object, the coefficient detected at the time t is averaged with the coefficient detected at the time t−1,
   for the curvelet coefficients belonging to an object, a weaker filtering is applied.

The method may also comprise an inverse transformation step where the denoised image is determined using the time-domain filtered coefficients.

According to one embodiment, the time-domain filtering step defines two gain coefficients α and β, with 0<α<β≤1.

if the curvelet coefficient has not been detected, or if it has been detected but has not been matched, the gain α is applied to the coefficients at the time t and the gain (1−α) to the same coefficient at t−1:

$$|\tilde{c}_t| = \alpha |c_t| + (1-\alpha)|\tilde{c}_{t-1}|$$

if the coefficient has been detected at the time t or at the time t−1, a gain β is applied to it, and a gain that decreases from β to α is applied to its neighbors, as a function of the distance from the neighbor to the detected coefficient with a given rate of decrease.

According to one embodiment, the rate of decrease of the gain is applied in a linear or Gaussian manner.

The curvelet coefficients detected at the time t are, for example, averaged with the set of the curvelet coefficients detected at the time t−1 and with which they are matched.

According to one variant embodiment, the curvelet coefficients denoised at the time t are used in place of the noisy curvelet coefficients in the averaging, either for the coefficients having belonged to a trait at the preceding time, or for the coefficients belonging to a trait matched at this time, or for these two types of coefficients.

In order to match the traits belonging to the same object, the method executes, for example, the following steps:

a cost function is defined and the length, the intensity, the displacement, and the angle of the trait are used as resemblance indicators, the total energy is defined as $$E_{total} = w_l E_{length} + w_i E_{intensity} + w_d E_{displacement} + w_a E_{angle}$$

where $w_l$, $w_i$, $w_d$ and $w_a$ correspond to the confidence of the indicators, with $w_l$, $w_i$, $w_d$ and $w_a = 1$,
  this total energy is calculated for all the pairs of traits, one trait of which is detected at t and the other at t−1,
  a method is applied that is designed to obtain the list of the matchings minimizing the weights of the energies,
  if the curvelet coefficient does not correspond to a trait, then the method executes a time averaging step.

The length $L_{min}$ of the smallest of the traits to be compared and the length $L_{max}$ of the largest of the traits to be compared are defined, for example in the following manner:

$$E_{length} = 1 - \frac{L_{min}}{L_{max}}$$

$I_{min}$ the lower intensity of the two traits and $I_{max}$ the other $$E_{intensity} = 1 - \frac{I_{min}}{I_{max}}$$

$$E_{displacement} = \frac{(|i_t^I - i_{t-1}^I| + |i_t^E - i_{t-1}^E|)\frac{\mu}{m} + (|j_t^I - j_{t-1}^I| + |j_t^E - j_{t-1}^E|)\frac{\mu}{n}}{2}$$

the exponents I and E denote the extrema of the traits at the time t and t−1.

$$E_{angle} = v \times (\theta_{t-1} - \theta_t)_{[\Pi]}$$

where the θ represent the orientations of the detected traits at the times t and t−1.

The method can comprise a step for increasing the contrast of an image by multiplying the curvelet coefficients having a gain greater than $|\xi \times \beta|$ by a coefficient ρ, 1<ρ, with ξ chosen such that: $\alpha \leq \xi \beta < \beta$.

According to one variant embodiment, a multiplier coefficient ρ is applied to the detected curvelet coefficients, with a decrease from ρ to 1 within an intra-scale neighborhood.

BRIEF DESCRIPTION OF THE DRAWINGS

Other features and advantages of the method according to the invention will become more clearly apparent upon reading the description that follows of one exemplary embodiment presented by way of non-limiting illustration with appended figures that show.

DETAILED DESCRIPTION

Figure 2:
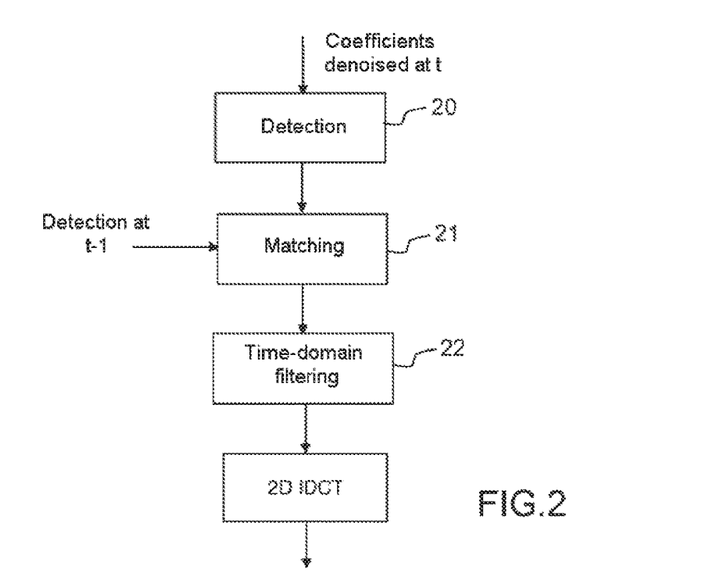
FIG. 2, a schematic layout of the method according to the invention.

The description that follows is presented by way of illustration and is in no way limiting. FIG. 2 shows schematically the principle of the time-domain filtering applied using the denoised coefficients obtained by the spatial denoising according to a principle known from the prior art, such as that described in FIG. 1.

The method uses the discrete curvelet transforms of the images from a sequence. The denoised coefficients are detected, 20, then transmitted at a step for locally matching the traits, 21, detailed further on in the description. The matched data subsequently undergo a step for time-domain filtering 22 allowing the movement of the objects to be preserved in the image and a step 23 for 2D inverse discrete curvelet transform (IDCT) so as to produce the final image.

In the curvelets, all the elements of a curved type present in an image, such as the 2D discontinuities, are represented in the form of segments; it is these that enable a reconstruction of the image.

In the following part of the description, a sequence of flouroscopic images $x_t$ acquired by an X-ray detector is considered, where t denotes the acquisition times in the sequence, the X-ray detector transmitting the data acquired to a suitable data processing device. Each image is composed of a matrix of pixels each having a value $x_t(p,q)$ representative of a signal level, with p and q respectively denoting the row and the column of the matrix. The value is for example coded over 16 bits and is in the range between 0 and 65535. The contrast-to-noise ratio is defined as follows:

CNR=(gray level of the object−gray level of the background)/σ

σ is defined as the standard deviation
where the noise is preferably determined over a region of the image where there are no objects of interest, where the contrast is determined based on points corresponding to an object of interest using a method known to those skilled in the art.

The links said to be parental relationships that are able to be established between a reference curvelet coefficient and coefficients which are linked to it are defined hereinafter. In this category, the parent coefficients, the neighbors and the cousins may be differentiated that are defined with respect to a reference coefficient. A parent coefficient is defined as a coefficient situated at the same relative position as the reference curvelet coefficient, but in the next scale of lower frequency. A neighboring coefficient corresponds to a coefficient situated at a position connected to the position of the curvelet coefficient. A neighboring coefficient situated in the direction of the curvelet, which is called aligned neighbor, is differentiated from other coefficients which are called non-aligned neighbors. The cousin coefficients are situated at the same relative position as that of the reference curvelet coefficient, but in another orientation. If the orientation is contiguous, the term 'adjacent cousin' is used. If the orientation is the opposite of the orientation of the coefficient, the term 'opposing cousin' is employed.

Figure 3:
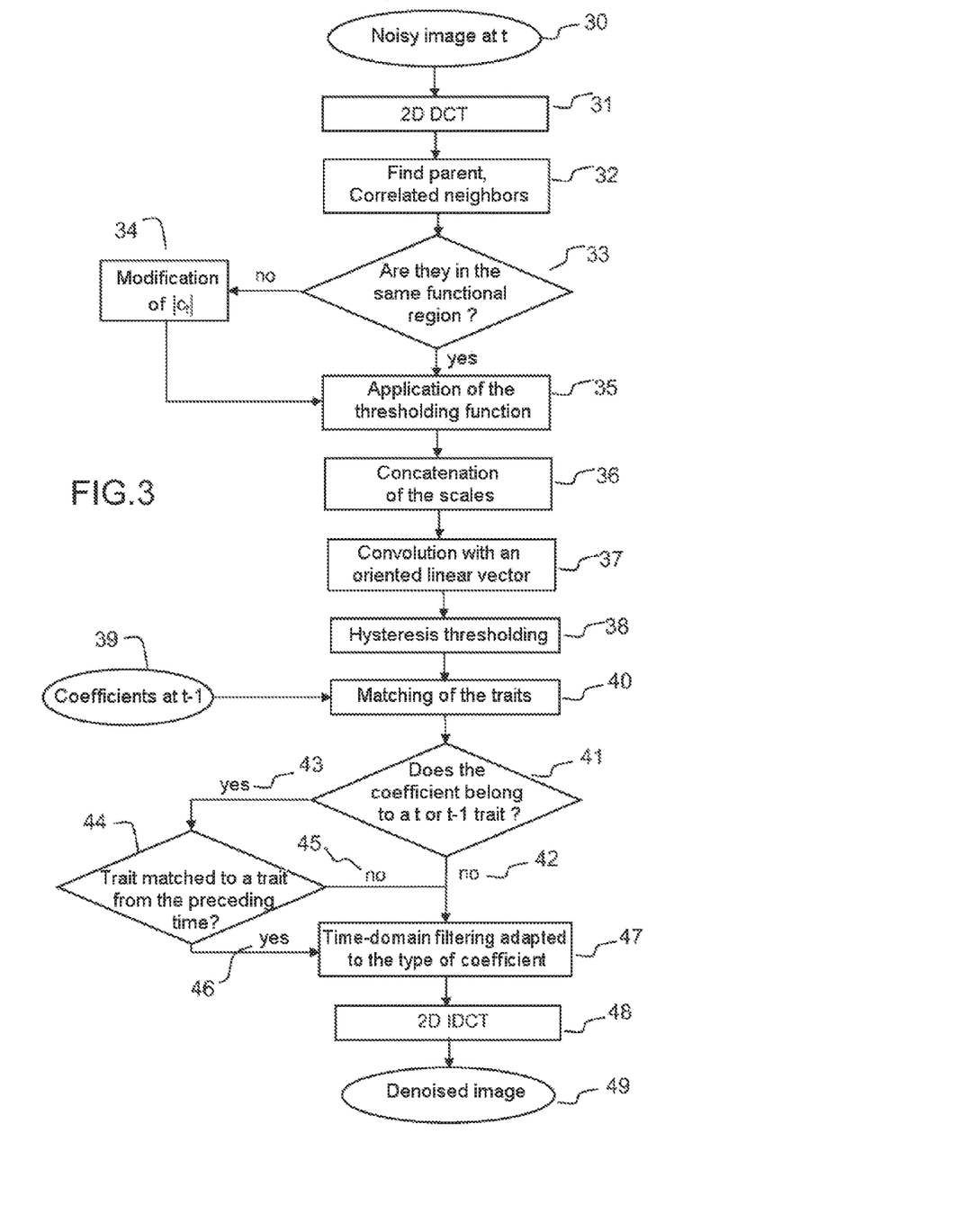
FIG. 3, possible steps for the implementation of the method.

FIG. 3 shows the succession of one example of steps implemented by the method according to the invention.

In a first step of the method according to the invention, the noisy image $x_t$ at t, 30, generated by the X-ray detector and transmitted to the image processing device, is spatially filtered 31 in order to obtain denoised coefficients obtained by spatial denoising.

Let $c_t^D$ be the discrete coefficients of the curvelet transform of an image at the time t. In the following, the exponent D is not included so as not to overload the notations. A curvelet coefficient is identified by its scale s which represents the resolution of the image (low frequency vs high frequency), its sub-band θsb, which is linked to the angle of a trait in the image, and its relative position represented by the torque (i, j), the coordinates of a coefficient in the sub-band of the curvelet representation of the image to which it belongs. Such a coefficient or curvelet coefficient is denoted $c_{t,s,\theta sb,i,j}$.

The steps referenced in FIG. 3, allowing the parents, 32, and the correlated neighbors, 33, to be found in order to determine whether these parents or correlated neighbors are in the same region and potentially, in step 34, to modify the coefficient $C_t$, are described in the application FR 2 978 273 filed by the applicant and known to those skilled in the art.

The thresholding step 35 produces the spatially denoised curvelet coefficients, $\hat{c}_{t,s,\theta sb,i,j}$ for an acquired image. The thresholding function 35 is composed, for example, of two steps: as a first stage, the coherence of the amplitude of the curvelet coefficient with the coefficients that are linked to it is verified, as has been previously defined, and this coherence is re-established where necessary. In a second stage, the thresholding function is applied.

The thresholding function is defined, for example, as a function of three thresholds T1, T2 and T3 (T1<T2<T3) which depend on the standard deviation (calculated on the initial noisy image). It can be written in the following manner:

$$|\hat{c}_{t,s,\theta_{sb},i,j}| = 0 \qquad si\ |c_{t,s,\theta_{sb},i,j}| < T_1$$

$$|\hat{c}_{t,s,\theta_{sb},i,j}| = |\hat{c}_{t,s,\theta_{sb},i,j}| - T_1 \qquad si\ T_1 < |c_{t,s,\theta_{sb},i,j}| < T_2$$

$$|\hat{c}_{t,s,\theta_{sb},i,j}| = \frac{1}{1+\exp(-\lambda(|\hat{c}_{t,s,\theta_{sb},i,j}|-\gamma))} - T_1 \qquad si\ T_2 < |c_{t,s,\theta_{sb},i,j}| < T_3$$

$$|\hat{c}_{t,s,\theta_{sb},i,j}| = |c_{t,s,\theta_{sb},i,j}| \qquad si\ T_3 < |c_{t,s,\theta_{sb},i,j}|$$

where γ and λ are parameters calculated such that the function is continuous over its interval of definition.

Since the neighbors and the parents are correlated to the curvelet coefficient in question, it is possible to verify the coherence of the information in the manner described hereinafter.

The step for spatial thresholding 35, is, for example, carried out on the coefficients found in the same functional region as the coefficient in question.

The parent coefficient $c_{parent}$ is the curvelet coefficient located at the same relative position as the curvelet coefficient $c_{t,s,\theta sb,i,j}$, in the sub-band representing the same orientation, at the scale of lowest frequency. Here, s−1 will be denoted the scale of lower frequency with respect to the scale s of the curvelet. If the number of orientations is lower, then $\theta_{sb}^{parent}=[\theta_{sb}/2]$, otherwise the same sub-band $\theta_{sb}^{parent}=\theta_{sb}$ is kept.

Similarly, by denoting $m_{s,\theta sb}$ and $n_{s,\theta sb}$ the dimensions of the sub-band at the scale s, then the new positions of the parent coefficient are deduced in the following manner:

$$i^{parent} = \left[\frac{i \times m_{s-1,\theta_{sb}^{parent}}}{m_{s,\theta_{sb}}}\right] \text{ and}$$

$$j^{parent} = \left[\frac{j \times n_{s-1,\theta_{sb}^{parent}}}{n_{s,\theta_{sb}}}\right]$$

It will then be verified that the curvelet coefficient $|c_{t,s}\theta_{sb,i,j}|$ is situated between the same thresholds as the neighboring curvelet coefficient $|c_{neighbors}|$ and the parent curvelet coefficient $|c_{t,s-1}\theta_{sb}^{parent},i^{parent},j^{parent}|$, while processing all the cases for belonging to different regions. In the following part, for the sake of simplification of the notations, the indices where the reading is obvious will be removed, and it will be indicated just by the parent denomination or the neighbor designation.

After the step for spatial thresholding 35, denoised curvelet coefficients corresponding to a given image are therefore obtained.

The method according to the invention implements a step for detection of the traits after the spatially-filtered decomposition of the image into curvelets. A decomposition with prior filtering notably allows the false positives during the detection to be reduced. Without departing from the scope of the invention, it would also be possible to use the noisy decomposition, and the steps described hereinafter may also be applied to non-filtered curvelet coefficients.

The detection of the traits in an image is for example carried out by using a concatenation 36 of the scales of the decomposition into curvelets. It starts by concatenating the curvelet coefficients of the image sub-band by sub-band. In other words, the scale at the highest frequency curvelet is adopted in the decomposition. This is called $s_{max}$. For each curvelet coefficient, $c_{t,s,\theta sb,i,j}$, its parents are calculated at the lower frequency scales being of interest (in other words, containing high frequency information). In the present example, the parents are calculated on only two scales, $u_{Max}=2$. These parent coefficients are subsequently summed. This therefore yields:

$$|C_{concatenated}| = \sum_{u=0}^{u_{Max}} |c_{s_{max}-u}^{parent}|$$

where $u_{Max}$ is the number of scales being considered, $s_{max}$−u is the index of a scale of the representation.

The concatenated coefficients only therefore depend on the time t and on the sub-band $\theta_{sb}$ (whose indices are taken at $s_{max}$). A row detection is applied to these matrices of concatenated coefficients. The first step is to calculate, for each concatenated coefficient, the maximum response, 37, of the oriented filters associated with this sub-band $\theta_{sb}$, i.e, by convolution with an oriented linear vector:

$$F(c_{concatenated}) = \max_{filters} \sum_{p,q \in filter} |c_{concatenated}(\theta_{sb}, i+p, j+q)|$$

The filters, being oriented filters, will be calculated at the start of the method, for example, or known in advance, according to methods known to those skilled in the art. The number of oriented vectors associated with a sub-band depends on the parameters of the decomposition and on the size of this vector. Typically, for a decomposition into curvelets with 6 scales and 12 angles at the low frequency scale, in order to detect small objects, vectors of length 5 may for example be taken. Under these conditions, one or two vectors per sub-band are sufficient to cover all the orientations.

The result of the convolution is subsequently segmented in order to identify the rows, for example, by means of a hysteresis thresholding 38. The traits thus obtained are recorded in a memory of the processing device in order to be compared between the images. The advantage of a thresholding by hysteresis is to limit the false positives and to avoid piece-wise detection of a segment.

The method will choose an overall threshold value for all the matrices of concatenated coefficients, a high threshold $T_{high}=\alpha T_{otsu}$ and a low threshold $T_{low}=\beta T_{otsu}$ with $\alpha > \beta$. For this purpose, the histogram of the maxima of the concatenated sub-bands will be calculated. In the case where some sub-bands only contain noise, the histogram exhibits a "peak" at low values. Further on in the values, the others maxima are represented. The overall threshold $T_{otsu}$ is given by the value resulting from the application of the method of Otsu, known to those skilled in the art, to this histogram, this value allowing a histogram to be separated into two. Another way of choosing these thresholds would be to define it as a function of the standard deviation of the noise. Thus, $T_{high}=\alpha\sigma_{sb}$ and $T_{low}=\beta\sigma_{sb}$ would be obtained.

The next step is a step 40 for matching the traits. The detection of the traits has allowed a collection of traits to be acquired whose position at each scale is known. Given that these positions are linked between the scales, only the position of a trait, which will be called referent, is now of interest, in other words the position of the trait at the highest frequency scale. The matching comprises two steps: the definition of a cost function and the optimization of this function. There exist several optimization methods known to those skilled in the art.

In the example that will be described, the optimization method chosen is the Kuhn-Munkres method. As cost function, a function is taken which takes into account the quantities judged to be important in the curvelet domain.

Given that the images are acquired in real time (15 to 30 images per second), and that these are anatomical images, it is expected that the detected contours have been modified very little between two images. For example, as resemblance indicators, the following indicators are chosen: the length, the intensity, the movement, the angle of the trait. Since the idea is to match the traits over time, a trait detected at the time t−1, 39, is therefore compared with traits detected at the time t, using the values of the coefficients detected at the time t−1 stored, 40, for example in the system. The expression time t−1" denotes, in a wider sense in the description, an earlier time relative to the time t in question, (t−1), (t−2), (t−3), etc.

The steps implemented for the matching traits are the following. It is tested, 41, whether the curvelet coefficient belongs to a trait detected at the time t or to a trait detected at the time t−1. If the curvelet coefficient does not belong to any detected trait, 42, then the method declares that it does not belong to an object but to the background of the image. If the curvelet coefficient belongs to a detected trait, 43, then the method tests, 44, whether the trait to which the coefficient belongs is matched to a trait detected at the preceding time t−1 or at the time t−2. In the case where the response is negative, 45, then the method considers the trait as belonging to the background of the image. In the opposite case, the coefficients composing the detected and matched trait are considered as forming part of the objects, 46. At the end of these steps, the method disposes of several sets of curvelet coefficients and of matched traits to which it will apply a step for time-domain filtering 47 adapted to the type of the curvelet coefficient. The first set will, for example, contain the curvelet coefficients which have been detected and matched, the second set could comprise the curvelet coefficients that are undetected or detected but not matched. The second set could be decomposed into two subsets, the first of which comprises the undetected coefficients, and the second the detected but unmatched coefficients. In this case, the coefficients for the time-domain filtering step will be different. The idea is for example to apply a stronger filtering for detected and unmatched coefficients than for undetected coefficients.

The energies corresponding to the traits are defined hereinbelow. $L_{min}$ will denote the length of the smallest of the traits to be compared, and $L_{max}$ the length of the largest of the traits to be compared:

$$E_{length} = 1 - \frac{L_{min}}{L_{max}}$$

Similarly, $I_{min}$ denotes the lowest intensity of the two traits and $I_{max}$ the other $$E_{intensity} = 1 - \frac{I_{min}}{I_{max}}$$

It is sought to minimize the total energy, hence to establish energies to be minimized, and which are all of the same order of magnitude. The lengths of the traits will be ordered so that the energy is equal to the same thing where there is a lengthening of the trait or a shrinking. In the example given, both of these possibilities are equivalent. The same is true for the intensity. Thus, these energies will be close to 0 if there has been no change, and close to 1 if there have been significant changes in the characteristics of the trait.

As regards the movement of the trait, the distance is measured, for example in the sense of Manhattan, between the two ends of the segments. In other words, the distances between a first end of the trait, detected at the time t and at the time t−1, and between the other end of the trait, detected at the time t and at the time t−1, are measured. This avoids, in the case of a rotation with respect to the center, having a distance of zero. Furthermore, in order to bring the distance back close to the value 1 in the case of a movement of the trait judged to be large, each of the results is normalized by the dimensions of the sub-band. Thus, the distance along one of the axes is multiplied by $\mu/m$, where m is the dimension (in the other case, it is divided by n) and $\mu$ is a parameter allowing the admissible movement to be fixed. For example, if this parameter is equal to 4, a movement of ¼ of the dimension is allowed. Beyond this value, the energy will be greater than 1, and will have significant detrimental effect on the total energy, such that the traits will not be matched. In order to guarantee this, if the energy of movement is greater than 1, a maximum value is imposed on the total energy, which corresponds to an impossible matching:

$$E_{displacement} = \frac{(|i_t^I - i_{t-1}^I| + |i_t^E - i_{t-1}^E|)\frac{\mu}{m} + (|j_t^I - j_{t-1}^I| + |j_t^E - j_{t-1}^E|)\frac{\mu}{n}}{2}$$

The exponents I and E denote the extrema of the traits at the time t and t−1.

Lastly, the energy linked to the angle of the trait is defined by:

$$E_{angle} = \nu \times (\theta_{t-1} - \theta_t)_{[\Pi]}$$

where the 'θ' represent the orientation of the traits at the times t and t−1. It is therefore the variation which is adversely affected, modulo π. This energy is multiplied by a parameter ν so that it is close to 1 when the variation of the orientations is too great. As radians are being used here, variations of the order of one tenth are judged large. Thus, a value of 10 for this parameter allows the energy to be close to 1 when the variation is equal to 0.1 radians. The parameter may be adjusted as a function of the movement amplitude that it is desired to leave.

The total energy is therefore defined as follows:

$$E_{total}=w_l E_{length}+w_i E_{intensity}+w_d E_{displacement}+w_a E_{angle}$$

The coefficients $w_l$, $w_i$, $w_d$, $w_a$, are weights corresponding to the confidence in the indicators. The sum of these 4 weights must be equal to 1. For example, the weight associated with the energy linked to the length is lower than that associated with the angle, because a small variation in the extremum positions of the trait (due for example to slight movements in the detection) may result, in certain cases, in fairly large variations in the length (in the case where the lengths of the traits are short, for example), whereas the angle will not be greatly affected by these small movements. However, the length provides information, and it is therefore advantageous to conserve it.

This total energy $E_{total}$ is calculated for all the pairs of traits, one of which traits is detected at t and the other at t−1. In order to limit unnecessary calculations, the method is limited to the calculation of the energy for traits in neighboring sub-bands. This is because, if the traits are in widely separated sub-bands, their angles are very different and would result in a very high energy.

Finally, as previously mentioned, a maximum energy $E_{max}$ is established. If the trait reaches this maximum energy, or exceeds it, matching is not possible.

Once all the energies have been calculated, the Kuhn-Munkres method is applied which allows the list of the matchings minimizing the weight of the energies to be obtained. The traits having been matched are considered as actual signal. As far as the non-matched traits are concerned, they consist of a set of coefficients whose value is aberrant. They are commonly referred to as "outliers". Although it is a misuse of language, these non-matched traits will also here be denoted as "outliers".

The following step is a time-domain filtering 47 adapted according to the type of the coefficients. The time-domain filtering 47 uses the information previously obtained on the type of curvelet coefficients, detected and matched coefficients, or coefficients considered as being noise, in order to apply a different filtering depending on the type of the coefficient. This method allows a strong filtering to be applied in the regions where there is no movement, and a weaker filtering in the regions representing traits of interest.

Let $\alpha_{class}^t$ be the gain of the time-domain filtering at the time t, which depends on the class of the coefficients. The time-domain filtering may be written in the following manner:

$$|\tilde{c}_t|=\alpha_{class}^t|c_t|+(1-\alpha_{class}^t)|\tilde{c}_{t-1}|$$

One method of implementation uses, for example, two classes of coefficients with which two gain coefficients $\alpha$ and $\beta$ are associated, with $0<\alpha<\beta\leq 1$.

If the curvelet coefficient has not been detected or if it has been detected but has not been matched, it belongs to the second class. It is considered as forming part of an aberrant trait; the gain $\alpha$ is applied to this coefficient and the gain $(1-\alpha)$ to the same coefficient at t−1:

$$|\tilde{c}_t|=\alpha|c_t|+(1-\alpha)|\tilde{c}_{t-1}|$$

If the coefficient has been detected at the time t or at the time t−1, and the trait to which it belongs has been matched, a gain $\beta$ is applied to it, and to its neighbors is applied a gain which decreases from $\beta$ to $\alpha$, as a function of the distance from the neighbor to the detected coefficient, with a rate of decrease which may for example be linear or Gaussian:

$$|\tilde{c}_t|=\beta|c_t|+(1-\beta)|\tilde{c}_{t-1}|$$

This rate of decrease is applied within an intra-scale neighborhood. The same method is applied over all the sub-bands of the same scale, starting from a gain $\beta'$ such that $\alpha<\beta'\leq\beta$. Ramps are used in order to avoid rebound artifacts during the reconstruction. It may be chosen to apply this gain even to the scales of lower frequencies, where no detection has been made. In this case, the contrast of the coefficients, one of the children of which has been detected and matched, is increased. In the case of a conflict (in the case where various gains may be applied to the same coefficient owing to the ramps and to the decimation), it is the highest gain which is conserved.

In the case where $\beta=1$, this method allows the noise to be reduced while at the same time conserving the contrast of the objects of interest, and avoids the creation of a delay artifact.

In a second embodiment, the curvelet coefficients detected at the time t are averaged with the set of the curvelet coefficients detected at the time t−1 and with which they are matched.

In a third method, the denoised coefficients $|\tilde{c}_t|$ at the time t are used in place of the noisy coefficients $|c_t|$ in the averaging, either for the coefficients having belonged to a trait at the preceding time, or for the coefficients belonging to a trait matched at this time, or for these two types of coefficients.

According to one variant embodiment, it is possible to increase the contrast using the detected elements. This step may be carried out before or after the time-domain filtering step.

One method is for example to multiply all the curvelet coefficients whose gain is higher than $|\xi\times\beta|$ by a coefficient $\rho$, with $\rho>1$. This allows both the detected coefficients, together with the coefficients present in the neighboring sub-bands, to be increased, again avoiding the problem of the rebounds near the contours during the reconstruction. The coefficient $\xi$ must be chosen such that: $\alpha<\xi\beta<\beta$. The "outliers" having been removed by the matching step, the increase in contrast will only therefore be applied to the contours.

Another embodiment, which does not take into account the coefficients of the time-domain filtering, would be to apply a contrast enhancement coefficient in a similar manner to the method of time-domain filtering. A multiplier coefficient $\rho$ would be applied to the detected elements, with a decrease from $\rho$ to 1 within an intra-scale neighborhood. The same method is applied using a gain $\rho'$ ($1<\rho'\leq\rho$) to the sub-bands of the same scale. This method may also be applied across the scales. It is also possible to take a gain $\rho$ that depends on the scale, which allows the contrast to be further increased without locally increasing the noise.

The last step 48 of the method consists in applying a 2D IDCT transform in order to recover the denoised images 49.

Figure 4:
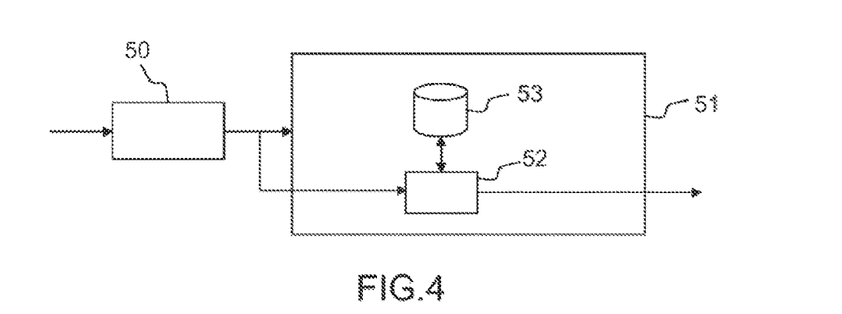
FIG. 4, a diagram of a system allowing the acquisition and the processing of the acquired images.

FIG. 4, shows one example of a system allowing the implementation of the method according to the invention. It comprises an X-ray detector, 50, detecting the images, the detector being connected to a processing device 51 comprising a processor 52 designed to execute the steps of the method according to the invention, and a memory 53 for storing the curvelet transforms.

The method according to the invention is notably based on a matching in the curvelets which notably allows the problem of transparency of the images to be overcome.

Indeed, by the physics of X-rays, the various anatomical layers are represented on the same plane in the image, and one pixel may represent various layers. In this context, a repositioning is not really possible since a single movement vector cannot be associated with each pixel, and since the layers have different movements, the objects present on one pixel will have different movements. As the curvelets separate the elements according to their orientation, and separate the background from the fine elements, on the fine coefficients, it is possible to assume, as a first approximation, that a single movement vector can be associated with each coefficient.

The invention claimed is:

1. A method for reducing noise in a sequence of fluoroscopic images acquired by an X-ray detector, an image comprising one or more traits, an image being represented by curvelet coefficients $c_{t,s,\theta sb,i,j}$, where s is the scale of the image, $\theta_{sb}$ its sub-band linked to the angle of a trait in the image and (i,j) its relative position, the method comprising in combination at least the following steps:
   detection of the traits in an image in the curvelet domain, using the curvelet coefficients sub-band by sub-band and by determining the maximum response of a filter associated with a sub-band $\theta_{sb}$, and the detected traits are stored in memory,
   locally matching the detected traits,
      considering a set of curvelet coefficients, testing whether a curvelet coefficient being considered belongs to a trait detected at the time t or at an earlier time,
      if the curvelet coefficient belongs to a detected trait, testing whether the trait, to which the coefficient belongs, is matched to a trait detected at an earlier time, if this is the case, then the curvelet coefficient is categorized in a first set,
      if the coefficient is not detected, or if the curvelet coefficient belongs to a trait detected but non matched to a trait detected at an earlier time, then forming at least a second set,
      applying a first coefficient for time-domain filtering the curvelet coefficients belonging to the first set and at least a second coefficient for time-domain filtering the curvelet coefficients belonging to the second set,
      determining the denoised image using the time-domain filtered curvelet coefficients.

2. The method as claimed in claim 1, comprising a step for detection of the traits comprising the following steps:
   detection of the trait or traits in the image by processing in the curvelet domain concatenating the curvelet coefficients sub-bands by sub-bands,
   adopting the scale at the highest frequency curvelet $s_{max}$ in the decomposition,
   calculating for each curvelet coefficient $c_{t,s,\theta sb,i,j}$, its parent coefficients at the lower scales containing high-frequency information,
   subsequently summing these curvelet coefficients so as to obtain a matrix of concatenated coefficients $c_{concatenated}$,
   applying the detection of the traits to the matrices of concatenated coefficients,
   calculating for each concatenated coefficient, the maximum response of the oriented filters associated with this sub-band:

$$F(c_{concatenated}) = \max_{filters} \sum_{p,q \in filter} |c_{concatenated}(\theta_{sb}, i+p, j+q)|$$

with p, q positions that yield an orientation,
   the result of the maximum response is thresholded by hysteresis which yields the traits retained and recorded for the given image; when a coefficient is greater than the high threshold, all of its extended neighborhood higher than the low threshold is conserved,
   defining a reference trait by selecting the position of the trait at the scale of highest frequency.

3. The method as claimed in claim 1, comprising a step for local matching of the traits comprising the following steps:
   considering a set of curvelet coefficients defined at a time t−1 earlier than the time t,
   testing whether a curvelet coefficient belongs to a trait detected at the time t or at the time t−1,
   if the result of the test is negative, then the curvelet coefficient is categorized as not belonging to an object,
   if the result of the test is positive, then
   testing whether the trait to which the coefficient belongs is matched to a trait detected at the time t−1 or at the time t−2,
   if the result of the test is negative, then the curvelet coefficient is categorized as not belonging to an object,
   if the result of the test is positive, then the curvelet coefficient is categorized as belonging to an object,
   obtaining at least two sets of coefficients corresponding to at least two types of curvelet coefficients.

4. The method as claimed in claim 1, comprising a step for time-domain filtering comprising the following steps:
   for the curvelet coefficients not belonging to an object, averaging the coefficient detected at the time t with the coefficient detected at the time t−1,
   for the curvelet coefficients belonging to an object, applying a weaker filtering.

5. The method as claimed in claim 1, comprising an inverse transformation step where the denoised image is determined using the time-domain filtered coefficients.

6. The method as claimed in claim 1, wherein, for the time-domain filtering step defines two gain coefficients α et β, with $0 < \alpha < \beta \leq 1$:
   if the curvelet coefficient has not been detected, or if it has been detected but has not been matched, applying the gain α to the coefficients at the time t and the gain (1−α) to the same coefficient at t−1

$$|\tilde{c}_t| = \alpha |c_t| + (1-\alpha)|\tilde{c}_{t-1}|$$

if the coefficient has been detected at the time t or at the time t−1, applying a gain β to it, and applying a gain that decreases from β to α to its neighbors, as a function of the distance from the neighbor to the detected coefficient with a given rate of decrease.

7. The method as claimed in claim 6, wherein the rate of decrease of the gain is applied in a linear or Gaussian manner.

8. The method as claimed in claim 6, comprising a step for increasing the contrast of an image by multiplying the curvelet coefficients having a gain greater than $|\xi \times \beta|$ by a coefficient ρ, $1 < \rho$, with ξ chosen such that: $\alpha \leq \xi \beta < \beta$.

9. The method as claimed in claim 1, wherein the curvelet coefficients detected at the time t are averaged with the set of the curvelet coefficients detected at the time t−1 and with which they are matched.

10. The method as claimed in claim 9, wherein the curvelet coefficients denoised at the time t are used in place of the noisy curvelet coefficients in the averaging, either for the coefficients having belonged to a trait at the preceding time, or for the coefficients belonging to a trait matched at this time, or for these two types of coefficients.

11. The method as claimed in claim 1, wherein, in order to match the traits belonging to the same object, the following steps are executed:
defining a cost function and the length, the intensity, the displacement, and using the angle of the trait as resemblance indicators,
defining the total energy as:

$$E_{total} = w_l E_{length} + w_i E_{intensity} + w_d E_{displacement} + w_a E_{angle}$$

where $w_l$, $w_i$, $w_d$ and $w_a$ correspond to the confidence of the indicators, with $w_l$, $w_i$, $w_d$ and $w_a = 1$
calculating this total energy for all the pairs of traits, one trait of which is detected at t and the other at t−1,
applying a method that is adapted to obtain the list of the matchings minimizing the weight of the energies,
if the curvelet coefficient does not correspond to a trait, then the method executes a time averaging step.

12. The method as claimed in claim 11, wherein the following are defined: $L_{min}$ the length of the smallest of the traits to be compared and $L_{max}$ the length of the largest of the traits to be compared:

$$E_{length} = 1 - \frac{L_{min}}{L_{max}}$$

with $I_{min}$ the lower intensity of the two traits and $I_{max}$ the other $$E_{intensity} = 1 - \frac{I_{min}}{I_{max}}$$

$$E_{displacement} = \frac{(|i_t^I - i_{t-1}^I| + |i_t^E - i_{t-1}^E|)\frac{\mu}{m} + (|j_t^I - j_{t-1}^I| + |j_t^E - j_{t-1}^E|)\frac{\mu}{n}}{2}$$

the exponents I and E denote the extrema of the traits at the time t and t−1

$$E_{angle} = v \times (\theta_{t-1} - \theta_t)_{[\Pi]}$$

where the $\theta$ represent the orientations of the detected traits at the times t and t−1.

13. The method as claimed in claim 1, wherein a multiplier coefficient $\rho$ is applied to the detected curvelet coefficients, with a decrease from $\rho$ to 1 within an intra-scale neighborhood.

* * * * *